(12) United States Patent
Franklin (10) Patent No.: US 8,434,151 B1
(45) Date of Patent: Apr. 30, 2013

(54) DETECTING MALICIOUS SOFTWARE

(75) Inventor: Douglas North Franklin, Atlanta, GA (US)

(73) Assignee: International Business Machines Corporation, Armonk, NY (US)

( * ) Notice: Subject to any disclaimer, the term of this patent is extended or adjusted under 35 U.S.C. 154(b) by 934 days.

(21) Appl. No.: 11/969,480

(22) Filed: Jan. 4, 2008

(51) Int. Cl.
*G06F 21/00* (2006.01)
(52) U.S. Cl.
USPC .................. 726/24; 726/22; 726/23; 726/25; 726/26; 713/187; 713/188; 717/127; 717/128; 717/131; 717/134; 717/135
(58) Field of Classification Search .............. 726/22–26; 709/224; 713/187–188; 717/127–135
See application file for complete search history.

(56) References Cited

U.S. PATENT DOCUMENTS

| | | | |
|---|---|---|---|
| 6,775,780 B1 | 8/2004 | Muttik | |
| 7,093,239 B1 * | 8/2006 | van der Made | 717/135 |
| 7,146,305 B2 | 12/2006 | Van der Made | |
| 7,587,724 B2 * | 9/2009 | Yeap | 719/328 |
| 7,779,472 B1 * | 8/2010 | Lou | 726/24 |
| 2003/0212913 A1 * | 11/2003 | Vella | 713/202 |
| 2004/0013250 A1 * | 1/2004 | Kotnur et al. | 379/112.01 |
| 2004/0243829 A1 * | 12/2004 | Jordan | 713/200 |
| 2005/0154900 A1 | 7/2005 | Muttik | |
| 2005/0278785 A1 * | 12/2005 | Lieberman | 726/24 |
| 2006/0015940 A1 | 1/2006 | Zamir et al. | |
| 2007/0079371 A1 | 4/2007 | Laird-McConnell | |
| 2009/0126015 A1 * | 5/2009 | Monastyrsky et al. | 726/23 |

OTHER PUBLICATIONS

Dynamic analysis of malicious code by Bayer et al; Publisher: Springer-Verlag; Date: May 16, 2006.*

* cited by examiner

*Primary Examiner* — Taghi Arani
*Assistant Examiner* — Madhuri Herzog
(74) *Attorney, Agent, or Firm* — Yee & Associates, P.C.; Arthur Samodovitz (57) ABSTRACT

A computer implemented method, apparatus, and program code for detecting malicious software components. A series of calls made by a software component is monitored to identify an identified respective series of call types to components named in the calls. A determination is made as to whether the identified respective series of call types to components named in the calls is indicative of malicious behavior.

23 Claims, 3 Drawing Sheets

DETECTING MALICIOUS SOFTWARE

BACKGROUND OF THE INVENTION

1. Field of the Invention

The present invention relates generally to an improved data processing system and in particular to a method and apparatus for processing data. Still more particularly, the present invention relates to a computer implemented method, apparatus, and program code for detecting malicious software.

2. Description of the Related Art

Malware is software designed to infiltrate a data processing system without the consent of a user or owner of the data processing system. Malware may include, for example, a virus, a worm, a Trojan horse, spyware, unauthorized adware, and other malicious and unwanted software. A virus is a computer program that can copy itself and infect a data processing system without permission or knowledge of a user. A computer virus may seek a host, such as a program or document, to infect a data processing system and replicate itself each time the document or program is opened.

Another example of malware is a worm, which is a program that actively transmits itself over a network to infect other computers. A Trojan horse is any program that invites a user to run the program and conceals harmful and malicious code. This hidden code may take effect immediately or may take effect after some period of time. Malware may do no damage to a system but may simply replicate themselves. This type of malware also may make their presence known by presenting text, video, or audio messages. Other types of malware, however, may result in erratic behavior, loss of files, or system crashes.

In response to these and other types of malware, various malware detection applications have been developed to detect and/or remove malware. In these examples, an application may be one or more programs or other software components. Software components may include both executable and non-executable files. Once malware has been detected, the malware can be removed and/or prevented from executing on a data processing system.

Protection against malware may come in different forms. Some malware detection applications may execute individually in computers while other malware applications may execute on devices, such as routers or firewalls to prevent entry of malware into a network. A malware detection application may provide intrusion prevention to protect against attacks from malware.

These applications may use signature detection to identify malware, such as viruses. A virus signature is a characteristic byte pattern that is part of a particular virus or family of viruses. This pattern signature may be used to identify viruses. Further, these applications may include behavioral analysis to identify against unknown malware. With viruses that have not yet been detected, the behavior of software components may be analyzed to determine whether they may be malware.

These malware detection applications also may use other methods to identify unknown or new viruses. This type of identification may be performed by identifying suspicious behavior from a software component, which might indicate the presence of malware. This type of analysis may emulate the operating system and run the executable file or component in a simulation. After the software component has terminated execution, an analysis is made for changes that may indicate the presence of malware. These and other approaches may be used to identify potential malware.

SUMMARY OF THE INVENTION

The illustrative embodiments provide a computer implemented method, apparatus, and program code for detecting malicious software components. A series of calls made by a software component is monitored to identify an identified respective series of call types to components named in said calls. A determination is made as to whether the identified respective series of call types to components named in said calls is indicative of malicious behavior.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
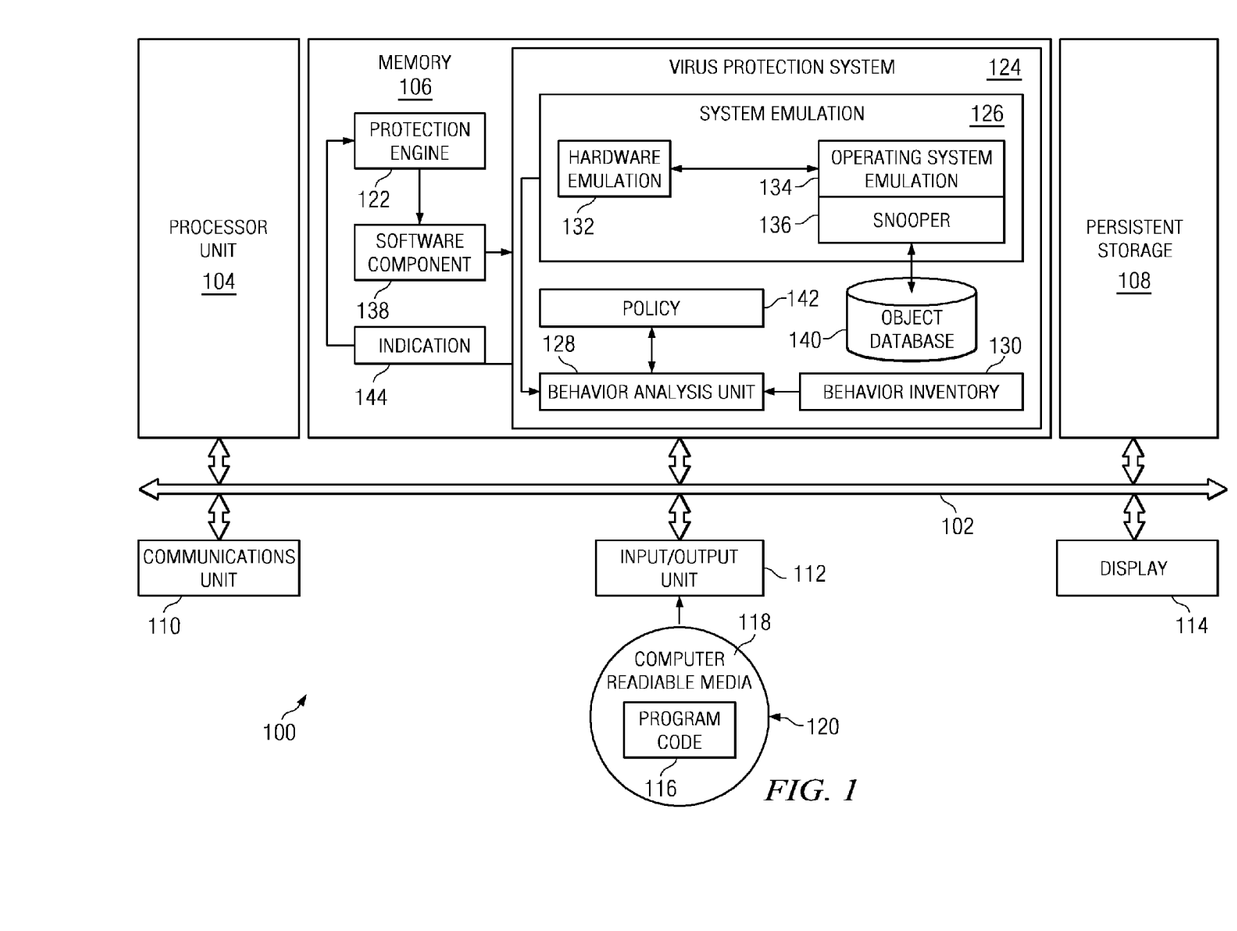
FIG. 1 is a diagram of a data processing system in accordance with an illustrative embodiment.

Turning now to FIG. 1, a diagram of a data processing system is depicted in accordance with an illustrative embodiment. In this illustrative example, data processing system 100 includes communications fabric 102, which provides communications between processor unit 104, memory 106, persistent storage 108, communications unit 110, input/output (I/O) unit 112, and display 114.

Processor unit 104 serves to execute instructions for software that may be loaded into memory 106. Processor unit 104 may be a set of one or more processors, each of which may have one or more processor cores, depending on the particular implementation. Further, processor unit 104 may be implemented using one or more heterogeneous processor systems in which a main processor is present with secondary processors on a single chip. As another illustrative example, processor unit 104 may be a symmetric multi-processor system containing multiple processors of the same type.

Memory 106, in these examples, may be, for example, a random access memory or any other suitable volatile or non-volatile storage device. Persistent storage 108 may take various forms depending on the particular implementation. For example, persistent storage 108 may contain one or more components or devices. For example, persistent storage 108 may be a hard drive, a flash memory, a rewritable optical disk, a rewritable magnetic tape, or some combination of the above. The media used by persistent storage 108 also may be removable. For example, a removable hard drive may be used for persistent storage 108.

Communications unit 110, in these examples, provides for communications with other data processing systems or devices. In these examples, communications unit 110 is a network interface card. Communications unit 110 may provide communications through the use of either or both physical and wireless communications links.

Input/output unit 112 allows for input and output of data with other devices that may be connected to data processing system 100. For example, input/output unit 112 may provide a connection for user input through a keyboard and mouse. Further, input/output unit 112 may send output to a printer. Display 114 provides a mechanism to display information to a user.

Instructions for the operating system and applications or programs are located on persistent storage 108. These instructions may be loaded into memory 106 for execution by processor unit 104. The processes of the different embodiments may be performed by processor unit 104 using computer implemented instructions, which may be located in a memory, such as memory 106. These instructions are referred to as program code, computer usable program code, or computer readable program code that may be read and executed by a processor in processor unit 104. The program code in the different embodiments may be embodied on different physical or tangible computer readable media, such as memory 106 or persistent storage 108.

Currently used mechanisms may look for malicious components by analyzing a series of call types that may be indicative of malicious behavior. In these illustrative examples, the different embodiments recognize that the currently used mechanisms for identifying malicious software components may result in an undesired number of false positives.

A false positive is an indication that a software component is a malicious component when in actuality the software component is not a malicious one. The different illustrative embodiments recognize that certain types of calls to specific components may be more indicative of the presence of malware as opposed to the same call types to other named components.

Thus, the different illustrative embodiments may reduce the number of false positives by looking at additional factors. In the illustrative embodiments, a series of call types to named components are analyzed rather than just a series of call types. This type of monitoring and analysis may reduce the number of false positives. These types of processes may be implemented in various software applications or suites that provide protection against malicious components.

In these examples, the different illustrative embodiments may be implemented within software components located in memory 106. In these examples, protection engine 122 and virus protection system 124 are located within memory 106. These components may be part of a security system used to detect and block the execution of malicious code within data processing system 100. These components may be found within a software application, such as, for example, without limitation, Proventia Network Intrusion Prevention System, which is available from International Business Machines Corporation.

Virus protection system 124 includes system emulation 126, behavior analysis unit 128, and behavior inventory 130, snooper 136, object database 140, and policy 142. System emulation 126 is an emulation of components within data processing system 100. Hardware emulation 132 emulates hardware within data processing system 100. Operating system emulation 134 provides an emulation of the operating environment within data processing system 100 for software components.

Snooper 136 detects calls made by a software component of interest, such as software component 138 executing within system emulation 126. Snooper 136 selectively places calls or records of calls into behavior inventory 130 using object database 140. Object database 140 contains an identification of components considered to be suspicious components.

Snooper 136 compares the name of the components referenced by the call to components identified within object database 140. If a match is present, snooper 136 places the call type with the named components into behavior inventory 130 for further analysis. The collection of this information during the execution of software component 138 forms a series of call types to named components for analysis by behavior unit 128.

In these examples, virus protection system 124 may implement processes in behavior analysis unit 128 to detect various threats from malicious software components. For example, behavior analysis unit 128 contains processes used to analyze calls made by software component 138 executing within system emulation 126. Behavior analysis unit 128, in these examples, looks at a series of call types to named components using policy 142 to determine whether those calls to the named components indicate that software component 138 is a malicious one. The series of call types to named components also may be referred to as a pattern.

Policy 142 may be, for example, a set of rules and/or a set of patterns used to determine whether the series of call types to named components within inventory 130 indicate that software component 138 is a malicious software component. A pattern within policy 142 may be a series of call types to named components that have been identified indicating behavior of a malicious software component. In these examples, behavior analysis unit 128 may be implemented using various known analysis processes currently available in virus protection systems. These processes may be modified to encompass analyzing these series of call types to named components.

The named components referenced by the calls may be names of specific software components. These software components may be, for example, without limitation, dynamic link libraries, executable files, data files, configuration files, Universal Resource Locators, Universal Resource Names, and Universal Resource Identifiers. Additional examples of software components are Active X controls, object linking and embedding (OLE) controls, Java™ programs, and applets. In other embodiments, the named components may be for types of components rather than to a specific named component.

Behavior inventory 130 is an example of a collection of data that may be used by behavior analysis unit 128 to determine whether the series of calls made by a software component 138 is indicative of a malicious software component. Behavior inventory 130 contains a series of call types to named objects that have been identified as being suspicious by snooper 136. In some embodiments, behavior inventory 130 may include every call made by software component 138.

A series of call types to named components, in these examples, is an identification of calls in the order in which calls are made. The call types may be, for example, calls to read a file, save a file, write data into a file, write a value into a register, read a register, write data into a buffer, or otherwise access a file or other resource in a data processing system. Additional examples of call types may be ones that invoke a function in an external software component, connect to a network or network host, transfer data over a network, delete a file, rename a file, or write to a system configuration data repository.

Further, the named components may be to various components, such as a file, a name of a registry, a name of an active X control, a name of a Java™ option, and a specific Universal Resource Locator. The named components may be to various categories of named component types or may be to specific components.

In the illustrative embodiments, behavior inventory 130 is generated each time a software component, such as software component 138 is executed within system emulation 126. Behavior inventory 130 contains data used by behavior analysis unit 128 to determine whether software component 138 is a malicious software component.

Behavior inventory 130 contains an identification of call types made to named components selected by snooper 136. The collection of data within behavior inventory 130 may take the form of records in which each record identifies a call type and a named component. Further, these records may be placed into behavior inventory 130 in the order as identified by snooper 140 to form a series of sequential call types to named components for analysis. The determination as to whether a pattern within behavior inventory 130 is indicative of malicious made by behavior analysis unit 128 in these examples.

In operation, when a request is made with respect to software component 138, protection engine 122 may send software component 138 to virus protection system 124 for analysis prior to determining whether to actually perform the request. This request may be, for example, a request to save software component 138 or to execute software component 138.

In response to a request, protection engine 122 sends software component 138 to virus protection system 124. In response, virus protection system 124 allows software component 138 to execute within system emulation 126 for some selected period of time. During execution, software component 138 may make calls. These calls are a series of call types to named components, in these examples.

System emulation 126 emulates the execution of these calls, but does not actually allow the calls to be executed out of system emulation 126. In other words, software component 138 believes that a particular call has been made and receives a response to the call. For example, if software component 138 makes a call to access a function in a specific dynamic link library, operation system emulation 134 processes the call and returns a response as if the call was actually made to the specific dynamic link library.

All of these calls and responses occur within system emulation 126 in a manner that none of the calls made by software component 138 within system emulation 126 actually occur with respect to the actual operating system. As a result, no harm or damage may occur to other software components within data processing system 100 outside of system emulation 126.

In this manner, software component 138 may be isolated and examined without risk of harm to the actual operating environment for data processing system 100. Snooper 136 detects call types to the named components. In response to detecting a call, snooper 136 compares the named components of the call to components within object database 140. If a match is found, the call type to a particular named component is considered a suspicious component. This call type and the named component are placed into behavior inventory 130. As a result, during execution of software component 138, a set of call types to named components may be created in behavior inventory 130.

At some point in time, such as when software component 138 completes execution or in response to some other event, the series of call types to named components with behavior inventory 130 are analyzed by behavior analysis unit 128. Behavior analysis unit 128 takes this pattern formed by the series of call types to named components to policy 142 to determine whether software component 138 is a malicious software component. In other words, snooper 136 is notified each time software component 138 accesses another external component or resource.

Behavior analysis unit 128 compares the pattern identified for software component 138 in behavior inventory 130 to those patterns in policy 142 to determine whether a match occurs. Further, an exact match may not be needed in all cases. If the pattern for software component 138 is close enough to a particular pattern within policy 142, software component 138 also may be identified as being a malicious software component.

The result of this analysis by behavior analysis unit 128 is sent to protection engine 122 in indication 144. If indication 144 indicates that software component 138 is not a malicious software component, protection engine 122 then performs the request. For example, protection engine 122 may allow software component 138 to execute in the actual operating system of data processing system 100. In other examples, protection engine 122 may save software component 138.

If indication 144 indicates that software component 138 is a malicious component, protection engine 122 does not perform the request for software component 138. Protection engine 122 may generate a signature from software component 138 for future use. The signature for software component 138 may then be placed in a list or database for future reference such that another analysis of software component 138 does not have to be performed by virus protection system 124.

In these examples, by looking at the series of call types to named components, an ability to reduce false positives in identifying malicious software components may occur. For example, a series of calls to a particular known malware engine may indicate that software component 138 is a malicious component as opposed to calls made to a dynamic link library normally available in an operating system within data processing system 100. A malware engine may be distributed in the form of dynamic link libraries as well as unwanted adware. In addition to dynamic link libraries, a malware engine also may be distributed through other forms, such as Active X controls, objecting linking and embedding controls, Java™ programs, or applets.

Further, the use of snooper 136 also may improve changes of detecting previously unknown malicious software components if these components may use of any external component previously recognized as being potentially malicious. For example, if a new virus appears that makes use of the capabilities of an adware engine previously recognized and included within object database 140, the changes that this new virus may be detected. Program code 116 is located in a functional form on computer readable media 118 that is selectively removable and may be loaded onto or transferred to data processing system 100 for execution by processor unit 104.

Program code 116 may contain code for various software components such as those illustrated in memory 106. Program code 116 and computer readable media 118 form computer program product 120 in these examples. In one example, computer readable media 118 may be in a tangible form, such as, for example, an optical or magnetic disc that is inserted or placed into a drive or other device that is part of persistent storage 108 for transfer onto a storage device, such as a hard drive that is part of persistent storage 108.

In a tangible form, computer readable media 118 also may take the form of a persistent storage, such as a hard drive, a thumb drive, or a flash memory that is connected to data processing system 100. The tangible form of computer readable media 118 is also referred to as computer recordable storage media. In some instances, computer readable media 118 may not be removable.

Alternatively, program code 116 may be transferred to data processing system 100 from computer readable media 118 through a communications link to communications unit 110 and/or through a connection to input/output unit 112.

The different components illustrated for data processing system 100 are not meant to provide architectural limitations to the manner in which different embodiments may be implemented. The different illustrative embodiments may be implemented in a data processing system including components in addition to or in place of those illustrated for data processing system 100. Other components shown in FIG. 1 can be varied from the illustrative examples shown.

As one example, a storage device in data processing system 100 is any hardware apparatus that may store data. Memory 106, persistent storage 108 and computer readable media 118 are examples of storage devices in a tangible form.

In another example, a bus system may be used to implement communications fabric 102 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 106 or a cache such as found in an interface and memory controller hub that may be present in communications fabric 102.

As another example, virus protection system 124 may include other virus detection components. For example, virus protection system 124 also may include a function for comparing software components or code to digital signatures. Further, the different components illustrated within memory 106 are functional components and may be implemented in forms other than those shown in these illustrative examples.

Figure 2:
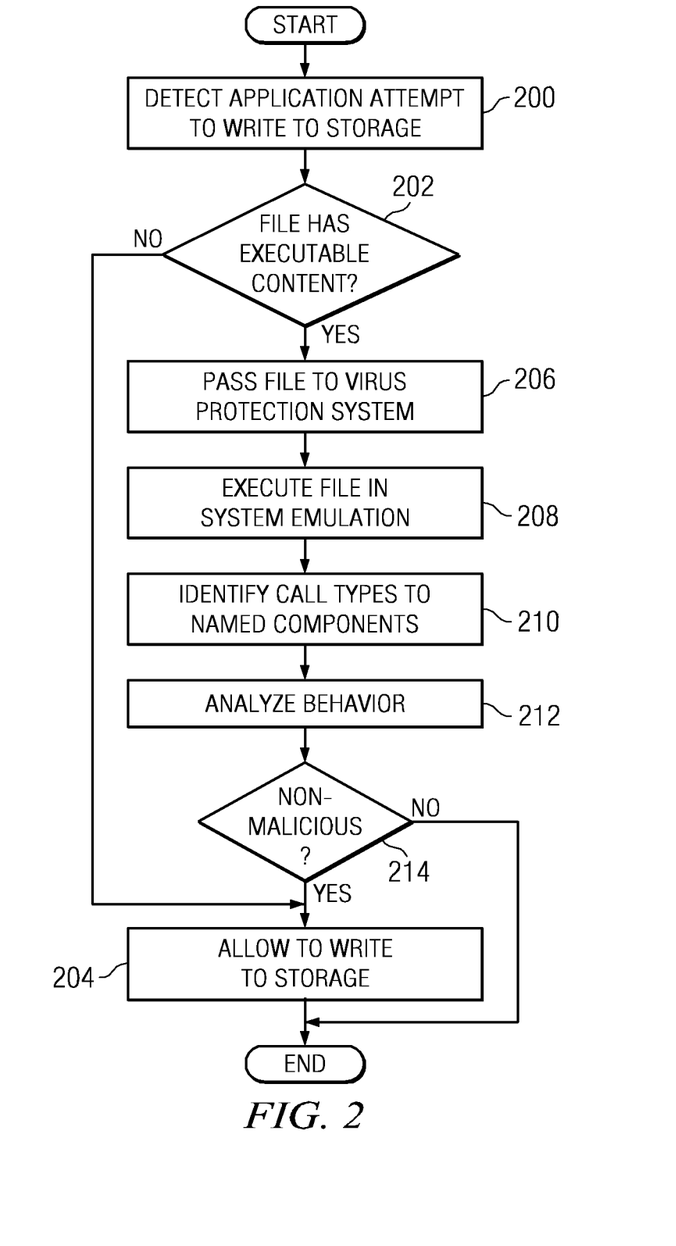
FIG. 2 is a flowchart of a process for detecting malicious software components in accordance with an illustrative embodiment.

Turning now to FIG. 2, a flowchart of a process for detecting malicious software components is depicted in accordance with an illustrative embodiment. The process illustrated in FIG. 2 may be implemented in a software protection application using components, such as protection engine 122 and virus protection system 124 in FIG. 1. In this example, the process illustrates the handling of a software component in the form of a file that is to be written to storage.

The process begins with protection engine 122 detecting an application attempting to write a file to storage (step 200). Protection engine 122 determines whether the file has executable content (step 202). If the file does not have executable content, protection engine 122 allows the file to be written to storage (step 204), with the process terminating thereafter.

With reference again to step 202, if the file being written to storage contains executable content, protection engine 122 passes the file to virus protection system 124 (step 206). Virus protection system 124 then executes the file in a system emulation (step 208). A snooper in the virus protection system, such as snooper 136 in FIG. 1, identifies call types made to named components during the execution of the file within the system emulation (step 210).

In these examples, snooper 136 receives a notification that a call has been made by the file. In response, snooper 136 determines whether the component subject to the call is a suspicious component. Any call types with suspicious objects are made part of the series of call types to named components for analysis. These call types made to named components form an identified behavior and pattern, and behavior analysis unit 128 in virus protection system 124 analyzes the behavior or pattern (step 212). The analysis is made by comparing the identified behavior or pattern with a policy, such as policy 142 in FIG. 1.

In these depicted examples, policy 142 takes the form of a set of patterns that may be used to determine whether the file is a malicious software component. In the illustrative embodiments, the file is identified as a malicious software component if a match with a pattern within policy 142 occurs with the pattern identified from the calls identified by snooper 136.

Based on this analysis, behavior analysis unit 128 determines whether the file is non-malicious (step 214). If the file is non-malicious, the process proceeds to step 204 as described above. Otherwise, the process terminates.

Figure 3:
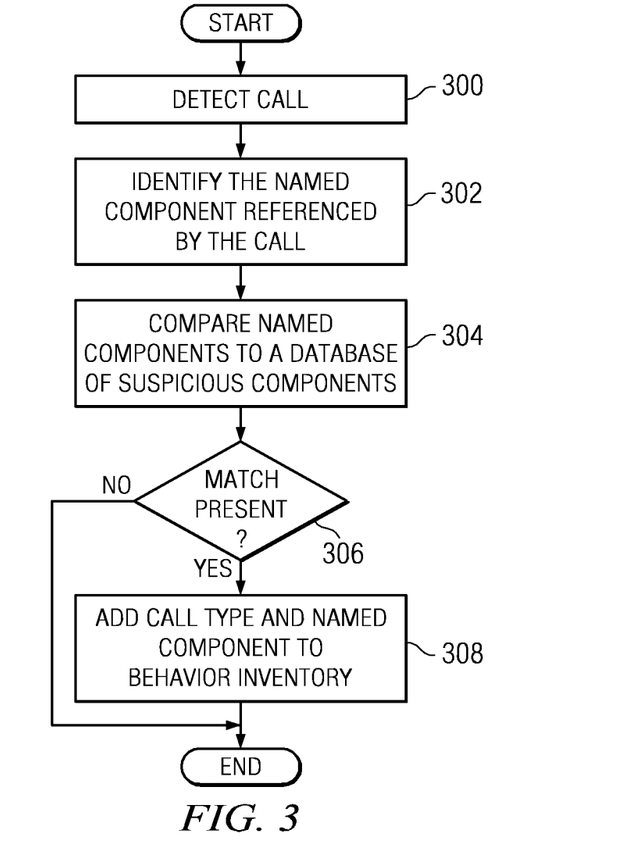
FIG. 3 is a flowchart of a process for identifying a series of calls to named objects in accordance with an illustrative embodiment.

Turning now to FIG. 3, a flowchart of a process for identifying a series of call types to named objects is depicted in accordance with an illustrative embodiment. The process illustrated in FIG. 3 may be implemented by a component, such as snooper 136, to identify call types made to suspicious components. The flowchart illustrated in FIG. 3 also may be a more detailed example of step 210 in FIG. 2.

The process begins by detecting a call (step 300). In this example, the call is made to a named component. Next, the process identifies the named component referred by the call (step 302). The process compares the identified named component to a database of suspicious components (step 304). The database of suspicious components may be, for example, object database 140 in FIG. 1.

Next, the process determines whether a match is present (step 306). If a match is present, the process adds the call type and the name of the component to the behavior inventory (step 308) with the process terminating thereafter.

With reference again to step 306, if a match is not present, the process terminates. This process is initiated each time a call is detected by snooper 136 in these examples. The collection of call types identified forms a series of call types to named components. This series of call types to named components may be a pattern used by the behavior analysis unit to determine whether the software component is a malicious software component.

Thus, the different illustrative embodiments provide a computer implemented method for detecting malicious software components. A series of calls made by a software component is monitored to form a series of detected calls. The call types to named components are identified within the series of detected calls to form an identified series of call types to named components. The determination of whether the identified series of call types by the software component is indicative of malicious behavior.

In this manner, by identifying the components to which the calls are directed, the different illustrative embodiments provide an ability for more granularities in the analysis of software components. Through this increased granularity, a reduction in false positives may occur.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer-readable medium can be any tangible apparatus that can store the program for use by or in connection with the instruction execution system, apparatus, or device.

The medium can be an electronic, magnetic, optical, electromagnetic, infrared, or semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-RAN) and DVD. In these illustrative examples, the term "a computer-readable, tangible storage device" does not include propagation media.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for detecting a malicious software component, the method comprising:
   a computer receiving a request to execute a potentially malicious software component in the computer or to write the potentially malicious software component to storage in the computer;
   responsive to receiving the request, the computer initiating execution of the potentially malicious software component in an emulated data processing system, the emulated data processing system isolating the potentially malicious software component from one or more other software components that are called by the potentially malicious software component such that if the potentially malicious software component is malicious, it will not damage the other software components;
   while executing the potentially malicious software component in the emulated data processing system, the potentially malicious software component making a series of calls specified by the potentially malicious software component to the emulated data processing system;
   the computer monitoring the series of calls made by the potentially malicious software component to the emulated data processing system to determine a respective series of call types to the other software components named in the series of calls;
   the emulated data processing system executing the series of calls;
   the computer determining whether the respective series of call types is indicative of a malicious behavior based on a comparison of the respective series of call types to a set of pre-determined call patterns indicative of malicious behavior for the potentially malicious software component; and
   allowing the request in response to determining the respective series of call types to the other software components named in the series of calls is not indicative of the malicious behavior.

2. The method of claim 1 further comprising:
   the computer determining that the respective series of call types is indicative of the malicious behavior, and in response, the computer preventing execution of the series of calls.

3. The method of claim 1 further comprising:
   responsive to a determination that the respective series of call types is indicative of the malicious behavior, the computer recording that the potentially malicious software component is a malicious software component.

4. The method of claim 1, wherein the determining step further comprises:
   the computer determining that a component referenced by one of the calls is a suspicious component, and in response, the computer determining that a type of the one of the calls is indicative of the malicious behavior.

5. The method of claim 1 wherein the computer has another data processing system used for executing trusted software programs, and further comprising the step of the computer determining that the respective series of call types to the other software components named in the series of calls to the emulated data processing system is indicative of the malicious behavior, and in response, the computer preventing the potentially malicious software component from executing in the another data processing system.

6. The method of claim 5, wherein a component named in one of the calls of the respective series of call types is selected from one of a dynamic link library, an executable file, and a Universal Resource Locator.

7. A computer program product for detecting malicious software components, the computer program product comprising:
   a computer-readable, tangible storage device;
   program code, stored on the computer-readable, tangible storage device, to receive a request to execute a potentially malicious software component;
   program code, stored on the computer-readable, tangible storage device, to initiate execution of the potentially malicious software component in an emulated data processing system, responsive to receiving the request, the emulated data processing system isolating the potentially malicious software component from one or more other software components that are called by the potentially malicious software component such that if the potentially malicious software component is malicious, it will not damage the other software components;
   program code, stored on the computer-readable, tangible storage device, to to monitor a series of calls made by the potentially malicious software component to the emulated data processing system to determine a respective series of call types to the other software components named in the series of calls, the emulated data processing system executing the series of calls, wherein while executing the potentially malicious software component in the emulated data processing system, the potentially malicious software component making the series of calls specified by the potentially malicious software component to the emulated data processing system;

program code, stored on the computer-readable, tangible storage device, to determine whether the respective series of call types is indicative of a malicious behavior based on a comparison of the respective series of call types to a set of pre-determined call patterns indicative of malicious behavior for the potentially malicious software component; and program code, stored on the computer-readable, tangible storage device, to allow the request in response to determining the respective series of call types to the other software components named in the series of calls is not indicative of the malicious behavior.

8. The computer program product of claim 7 further comprising:

program code, stored on the computer-readable, tangible storage device, for determining that the respective series of call types is indicative of the malicious behavior, and in response, the program code preventing execution of the series of calls.

9. The computer program product of claim 7 further comprising:

program code, stored on the computer-readable, tangible storage device, responsive to a determination that the respective series of call types is indicative of the malicious behavior, for the program code recording that the potentially malicious software component is a malicious software component.

10. The computer program product of claim 7, wherein the program code, stored on the computer-readable, tangible storage device, to determine whether the respective series of call types is indicative of the malicious behavior based on the comparison of the respective series of call types to the set of pre-determined call patterns indicative of malicious behavior for the potentially malicious software component further comprises:

program code, stored on the computer-readable, tangible storage device, for determining that a component referenced by one of the calls is a suspicious component, and program code, stored on the computer-readable, tangible storage device, in response, for determining that a type of the one of the calls is indicative of the malicious behavior.

11. The computer program product of claim 7 further comprising:

program code, stored on the computer-readable, tangible storage device, for executing the potentially malicious software component in another data processing system used for executing trusted software programs, and further comprising the step of the program code determining that the respective series of call types to the other software components named in the series of calls to the emulated data processing system is indicative of the malicious behavior, and in response, the program code preventing the potentially malicious software component from executing in the another data processing system.

12. A data processing system comprising:

a processor unit, a computer-readable, tangible storage device, and a memory;

first program code for receiving a request to write a potentially malicious software component to storage;

second program code for initiating execution of the potentially malicious software component in an emulated data processing system, responsive to receiving the request, the emulated data processing system isolating the potentially malicious software component from one or more other software components that are called by the potentially malicious software component such that if the potentially malicious software component is malicious, it will not damage other software components;

third program code for monitoring a series of calls made by the potentially malicious software component to the emulated data processing system to determine a respective series of call types to the other software components named in the series of calls, the emulated data processing system executing the series of calls, wherein while executing the potentially malicious software component in the emulated data processing system, the potentially malicious software component making the series of calls specified by the potentially malicious software component to the emulated data processing system;

fourth program code for determining whether the respective series of call types is indicative of a malicious behavior based on a comparison of the respective series of call types to a set of pre-determined call patterns indicative of malicious behavior for the potentially malicious software component; and fifth program code for allowing the request in response to determining the respective series of call types to the other software components named in the series of calls is not indicative of the malicious behavior, wherein the fifth program code is stored in the computer-readable, tangible storage device for execution by the processor unit via the memory, wherein the first program code, the second program code, the third program code, the fourth program code, and the fifth program code are stored in the computer-readable, tangible storage device for execution by the processor unit via the memory.

13. The data processing system of claim 12 further comprising:

sixth program code for determining that the respective series of call types is indicative of the malicious behavior, and in response, the sixth program code preventing execution of the series of calls, wherein the sixth program code is stored in the computer-readable, tangible storage device for execution by the processor unit via the memory.

14. The data processing system of claim 12 further comprising:

sixth program code for recording that the potentially malicious software component is a malicious software component in response to a determination that the respective series of call types is indicative of the malicious behavior, wherein the sixth program code is stored in the computer-readable, tangible storage device for execution by the processor unit via the memory.

15. The data processing system of claim 12, wherein the fourth program code comprises:

program code for determining that a component referenced by one of the calls is a suspicious component and, in response, for determining that a type of the one of the calls is indicative of the malicious behavior.

16. The data processing system of claim 12 further comprising:

sixth program code for executing the potentially malicious software component in another data processing system used for executing trusted software programs, and further comprising the step of the sixth program code determining that the respective series of call types to the other software components named in the series of calls to the emulated data processing system is indicative of the malicious behavior, and in response, the sixth program code preventing the potentially malicious software component from executing in the another data processing system, wherein the sixth program code is stored in the computer-readable, tangible storage device for execution by the processor unit via the memory.

17. The data processing system of claim 16, wherein a software component named in one of the calls of the respective series of call types is selected from one of a dynamic link library, an executable file, and a Universal Resource Locator.

18. The method of claim 1, wherein at least one pattern in the set of pre-determined call patterns comprises two or more call types arranged in a pre-determined order for identifying the malicious behavior.

19. The method of claim 1, wherein the set of pre-determined call patterns are retrieved from a policy for determining whether the respective series of call types to the other software components named in the series of calls is indicative of malicious behavior for the potentially malicious software component.

20. The method of claim 4 further comprising:
the computer determining that the suspicious component named in the series of calls is one of a pre-determined adware engine and a pre-determined malware engine, and in response, the computer preventing the potentially malicious software component from executing in another data processing system.

21. The data processing system of claim 12, wherein at least one pattern in the set of pre-determined call patterns comprises two or more call types arranged in a pre-determined order for identifying the malicious behavior.

22. The data processing system of claim 12, wherein the set of pre-determined call patterns are retrieved from a policy for determining whether the respective series of call types to the other software components named in the series of calls is indicative of malicious behavior for the potentially malicious software component.

23. The data processing system of claim 15 further comprising:
sixth program code for determining that the suspicious component named in the series of calls is one of a pre-determined adware engine and a pre-determined malware engine, and in response, preventing the potentially malicious software component from executing in another data processing system, wherein the sixth program code is stored in the computer-readable, tangible storage device for execution by the processor unit via the memory.

* * * * *